United States Patent
Chen et al.

(10) Patent No.: US 12,480,635 B1
(45) Date of Patent: Nov. 25, 2025

(54) MULTIFUNCTIONAL PHOTOGRAPHY LIGHT

(71) Applicant: Huizhou Latu Film Equipment Co. LTD, Huizhou (CN)

(72) Inventors: Jidi Chen, Huizhou (CN); Zhisheng Xu, Huizhou (CN)

(73) Assignee: Huizhou Latu Film Equipment Co.LTD, Huizhou (CN)

( * ) Notice: Subject to any disclaimer, the term of this patent is extended or adjusted under 35 U.S.C. 154(b) by 0 days.

(21) Appl. No.: 19/030,625

(22) Filed: Jan. 17, 2025

(30) Foreign Application Priority Data

Jan. 3, 2025 (CN) .......................... 202510007612.1

(51) Int. Cl.
| | |
|---|---|
| F21V 1/06 | (2006.01) |
| F21V 17/00 | (2006.01) |
| F21V 17/14 | (2006.01) |
| F21V 21/30 | (2006.01) |
| F21V 29/67 | (2015.01) |
| G03B 15/02 | (2021.01) |

(52) U.S. Cl.
CPC .............. *F21V 1/06* (2013.01); *F21V 17/007* (2013.01); *F21V 17/14* (2013.01); *F21V 29/67* (2015.01); *G03B 15/02* (2013.01); *F21V 21/30* (2013.01)

(58) Field of Classification Search
CPC .......... F21V 1/06; F21V 17/007; F21V 14/04; G03B 15/02; G03B 15/03; G03B 15/05; G03B 15/06; G03B 15/07
See application file for complete search history.

(56) References Cited

U.S. PATENT DOCUMENTS

| | | | | |
|---|---|---|---|---|
| 2,647,254 | A * | 7/1953 | Brunnhoelzl | F21L 4/00 362/186 |
| 3,787,675 | A * | 1/1974 | Rushing | F21L 4/00 362/205 |
| 6,808,294 | B2 * | 10/2004 | Pazula | F21V 1/06 362/357 |
| 11,035,533 | B1 * | 6/2021 | Rojas | F21S 6/002 |
| 2016/0290605 | A1 * | 10/2016 | Haskal | F21V 3/02 |
| 2017/0198873 | A1 * | 7/2017 | Ashmore | F21V 29/70 |
| 2019/0257479 | A1 * | 8/2019 | Horne | F21V 21/08 |
| 2023/0118931 | A1 * | 4/2023 | Yang | F21V 15/012 362/319 |
| 2025/0164857 | A1 * | 5/2025 | Yan | G03B 13/32 |

FOREIGN PATENT DOCUMENTS

CN         114815456 A * 7/2022 ............. G03B 15/02

* cited by examiner

*Primary Examiner* — Alexander K Garlen
(74) *Attorney, Agent, or Firm* — Birchwood IP (57) ABSTRACT

A multifunctional photography light is provided, which includes a lamp main body, a bracket, a heat dissipation fan, and a lampshade. The bracket is detachably provided on one side of the lamp main body, the lamp main body has a light emitting surface and a heat dissipation surface, the heat dissipation fan is provided on the heat dissipation surface, the lampshade is provided on the light emitting surface. The lamp main includes a base, a lighting component, and a control component. The lighting component is provided on the base, and the control component is electrically connected to the lighting component. The base is provided with a panel, an outer ring buckle seat, and an inner ring buckle seat. The outer ring buckle seat and the inner ring buckle seat are provided on the panel. The lampshade includes a main cover body, an outer connection ring, and an inner connection ring.

9 Claims, 8 Drawing Sheets

MULTIFUNCTIONAL PHOTOGRAPHY LIGHT

CROSS-REFERENCE TO RELATED APPLICATIONS

This application claims priority to Chinese Patent Application No. 202510007612.1, filed on Jan. 3, 2025, which is hereby incorporated by reference in its entirety.

TECHNICAL FIELD

The present disclosure relates to the field of photography light technologies, and in particular, to a multifunctional photography light.

BACKGROUND

The role of a photography light in a digital camera is similar to that of a flash in a digital camera. To capture dark objects, it is necessary to use these auxiliary light sources, otherwise the noise will be very large, and post-processing alone is not enough.

The existing photography lights usually have relatively large sizes. However, when used in outdoor scenes, larger volume photography lights can cause inconvenience for a user to carry and transport. Furthermore, in order to adjust multiple lighting modes, the photography lights are usually provided with various styles of lampshades, which further renders it difficult to carry and transport, thereby increasing the burden on the user.

Therefore, how to design a multifunctional photography light in a flat design that can meet needs of miniaturization and improve the lampshade on the basis of realizing multifunctional lighting modes, in order to improve a convenience of carrying and transporting and reduce a burden on the user, is a technical problem that technical personnel in this field need to solve.

SUMMARY

The purpose of the present disclosure is to overcome the shortcomings of the prior art and provide a multifunctional photography light in a flat design that can meet needs of miniaturization and improve the lampshade on the basis of realizing multifunctional lighting modes, in order to improve a convenience of carrying and transporting and reduce a burden on the user.

The purpose of the present disclosure is achieved through the following technical solutions.

A multifunctional photography light, including: a lamp main body, a bracket, a heat dissipation fan, and a lampshade; where the bracket is detachably provided on one side of the lamp main body, the lamp main body has a light emitting surface and a heat dissipation surface; the heat dissipation fan is provided on the heat dissipation surface, and the lampshade is provided on the light emitting surface;
  the lamp main body includes a base, a lighting component, and a control component; the lighting component is provided on the base, and the control component is electrically connected to the lighting component;
  the base is provided with a panel, an outer ring buckle seat, and an inner ring buckle seat at the light emitting surface; the outer ring buckle seat and the inner ring buckle seat are provided on the panel;
  the lampshade includes a main cover body, an outer connection ring, and an inner connection ring; the main cover body has a hollow conical structure; the outer connection ring and the inner connection ring are respectively provided at two ends of the main cover body; the outer connection ring is movably connected to the outer ring buckle seat, and the inner connection ring is movably connected to the inner ring buckle seat.

In an embodiment, the main cover body of the lampshade is a telescopic folding structure; a distance between the outer connection ring and the inner connection ring is changed by a telescopic folding of the main cover body.

In an embodiment, a reflective coating or a reflective film is provided on an inner side surface of the main cover body.

In an embodiment, the outer ring buckle seat and the inner ring buckle seat are both provided with a buckle notch, the outer connection ring and the inner connection ring are both provided with a buckle block, the buckle notch is cooperated with the buckle block.

In an embodiment, a linkage locking piece is provided on the panel, and the linkage locking piece is movably provided on the base through a spring; the linkage locking piece is provided with an outer ring protrusion and an inner ring protrusion;
  the outer ring protrusion is located at a position of the outer ring buckle seat and is configured to cooperate with the buckle block of the outer connection ring; the inner ring protrusion is located at a position of the inner ring buckle seat and is configured to cooperate with the buckle block of the inner connection ring.

In an embodiment, the lighting component includes a lighting slab, a reflect light barrel, and a lens, the reflect light barrel is mounted on the base by a bolt; the lighting slab is accommodated in the reflect light barrel, and the lens is provided on an end face of the reflect light barrel.

In an embodiment, the base is provided with a plurality of fins at the heat dissipation surface, and the heat dissipation fan is provided on the fins; the base is provided with a heat pipe, and the heat pipe is attached to a back of the lighting slab and extend to the fins.

In an embodiment, the control component includes a PCB board and a protective box, the PCB board is provided on the base, the protective box is provided on a periphery of the PCB board, and there is a sealant or a waterproof sealing ring between the protective box and the base.

In an embodiment, the lamp main body includes a corner guard, and the corner guard is provided at a corner of the base and is made of rubber material.

In summary, the multifunctional photography light in a flat design of the present disclosure, which can meet the needs of miniaturization and improve the lampshade on the basis of realizing multifunctional lighting modes, in order to improve a convenience of carrying and transporting and reduce the burden on the user.

BRIEF DESCRIPTION OF DRAWINGS

In order to provide a clearer explanation of the technical solution of the embodiments of the present disclosure, a brief introduction will be given below to the accompanying drawings required for use in the embodiments. It should be understood that the following drawings only illustrate some embodiments of the present disclosure and should not be considered as limiting the scope. For those skilled in the art, other relevant drawings can be obtained based on these drawings without creative work.

DESCRIPTION OF EMBODIMENTS

In order to facilitate the understanding of the present disclosure, a more comprehensive description of the present disclosure will be provided below with reference to the relevant drawings. Preferred embodiment of the present disclosure is shown in the accompanying drawings. However, the present disclosure can be implemented in many different forms and is not limited to the embodiments described herein. On the contrary, a purpose of providing these embodiments is to provide a more thorough and comprehensive understanding of the disclosed content of the present disclosure.

It should be noted that when a component is referred to as "fixed to" another component, it can be directly on the other component or there can also be a centered component. When a component is referred to be "connected" to another component, it can be directly connected to another component or there may be a central component present at the same time. Terms "vertical", "horizontal", "left", "right" and similar expressions used in this specification are for illustrative purposes only and do not represent the only implementation mode.

Unless otherwise defined, all technical and scientific terms used in this specification have the same meanings as those commonly understood by those skilled in the art belonging to the present disclosure. The terms used in this specification of the present disclosure are only for a purpose of describing specific embodiments and are not intended to limit the present disclosure. Term "and/or" used in this specification includes any and all combinations of one or more related listed items.

Figure 1:
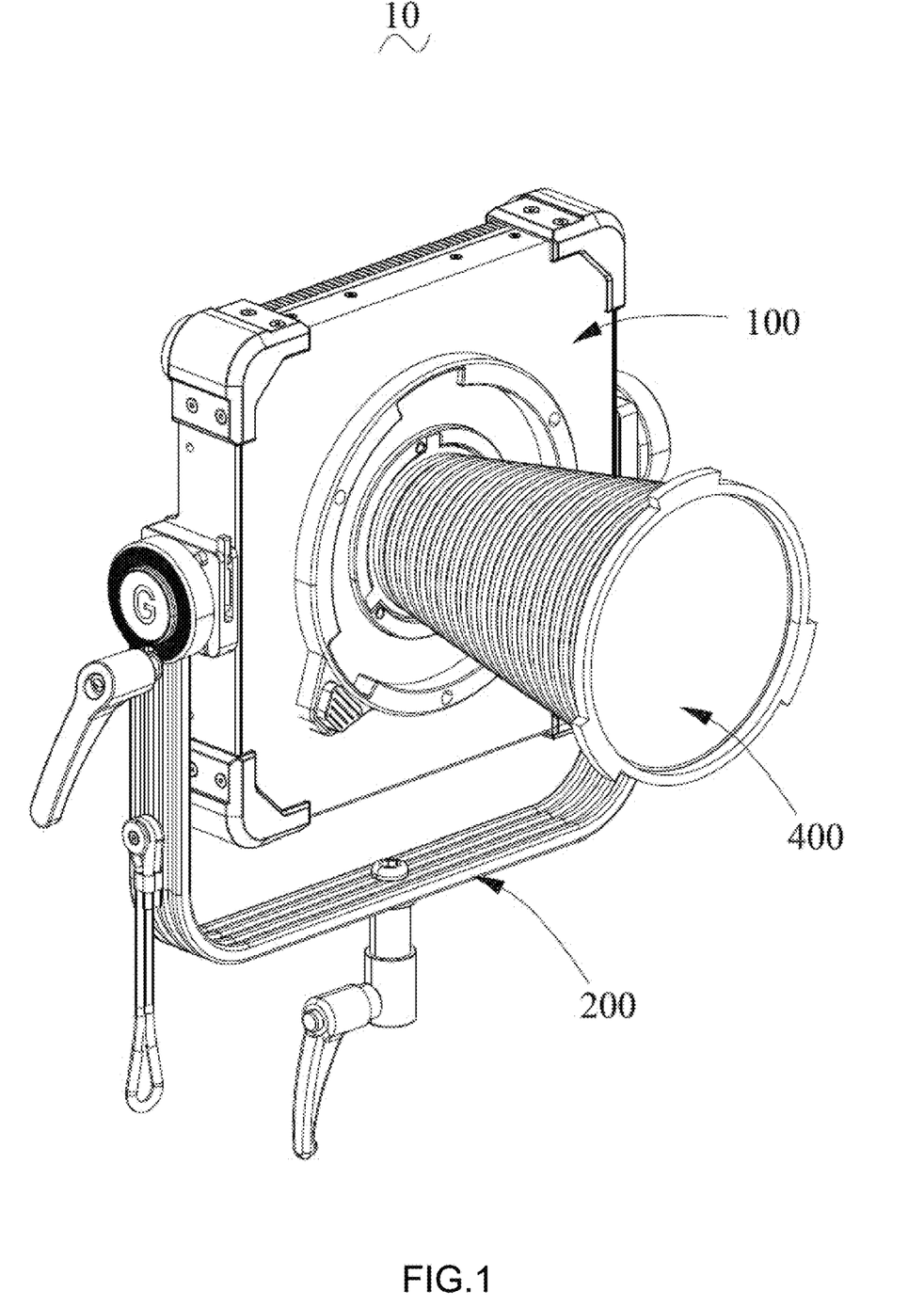
FIG. 1 is a schematic structural diagram of a multifunctional photography light according to the present disclosure.
Figure 2:
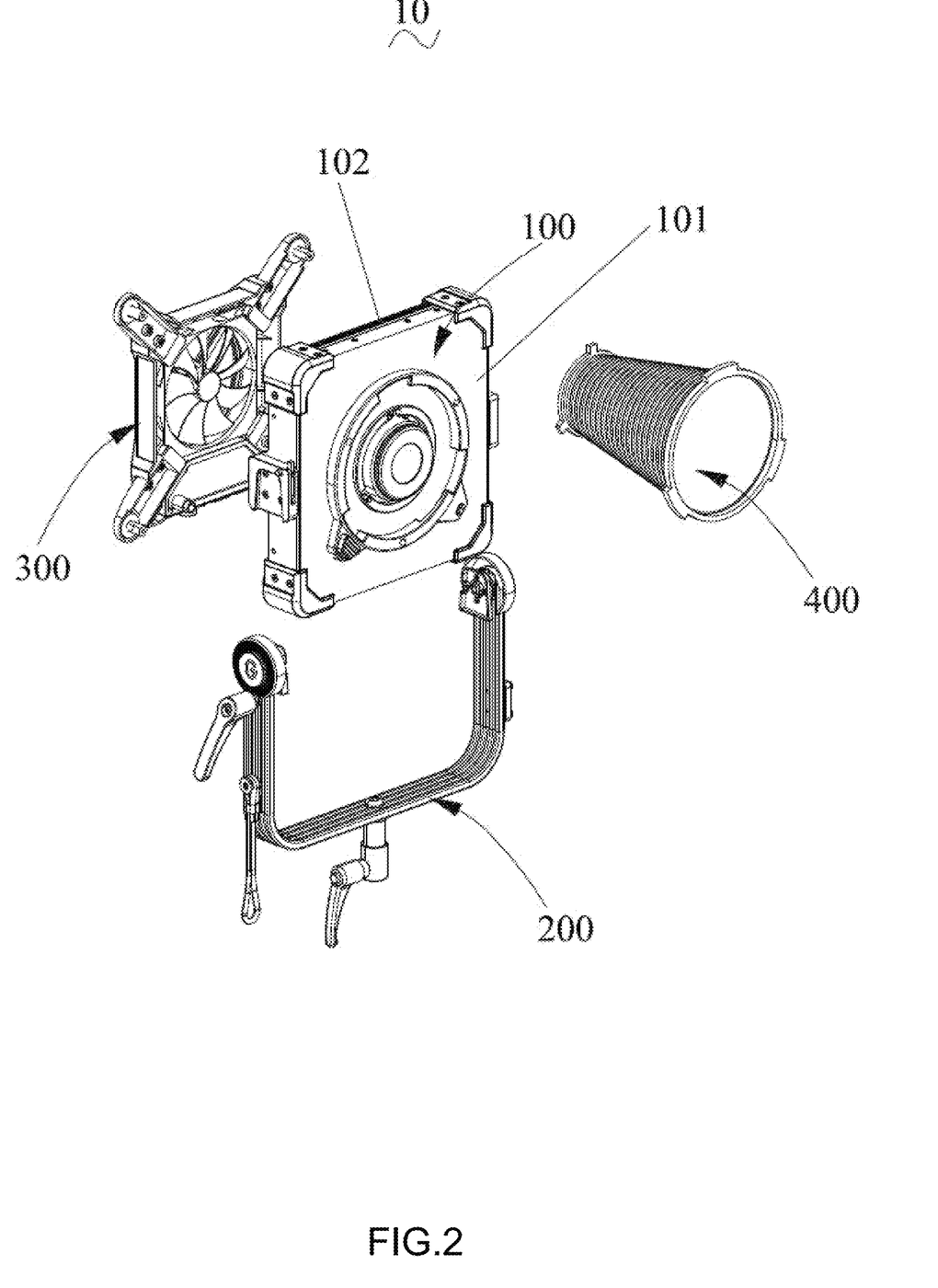
FIG. 2 is an exploded schematic diagram of the multi-functional photography light shown in FIG. 1.

The present disclosure is a multifunctional photography light 10 for achieving flatness, as shown in FIGS. 1 and 2, including a lamp main body 100, a bracket 200, a heat dissipation fan 300, and a lampshade 400. The bracket 200 is detachably provided on one side of the lamp main body 100, and the lamp main body 100 has a light emitting surface 101 and a heat dissipation surface 102. The heat dissipation fan 300 is provided on the heat dissipating surface 102, and the lampshade 400 is provided on the light emitting surface 101.

Figure 3:
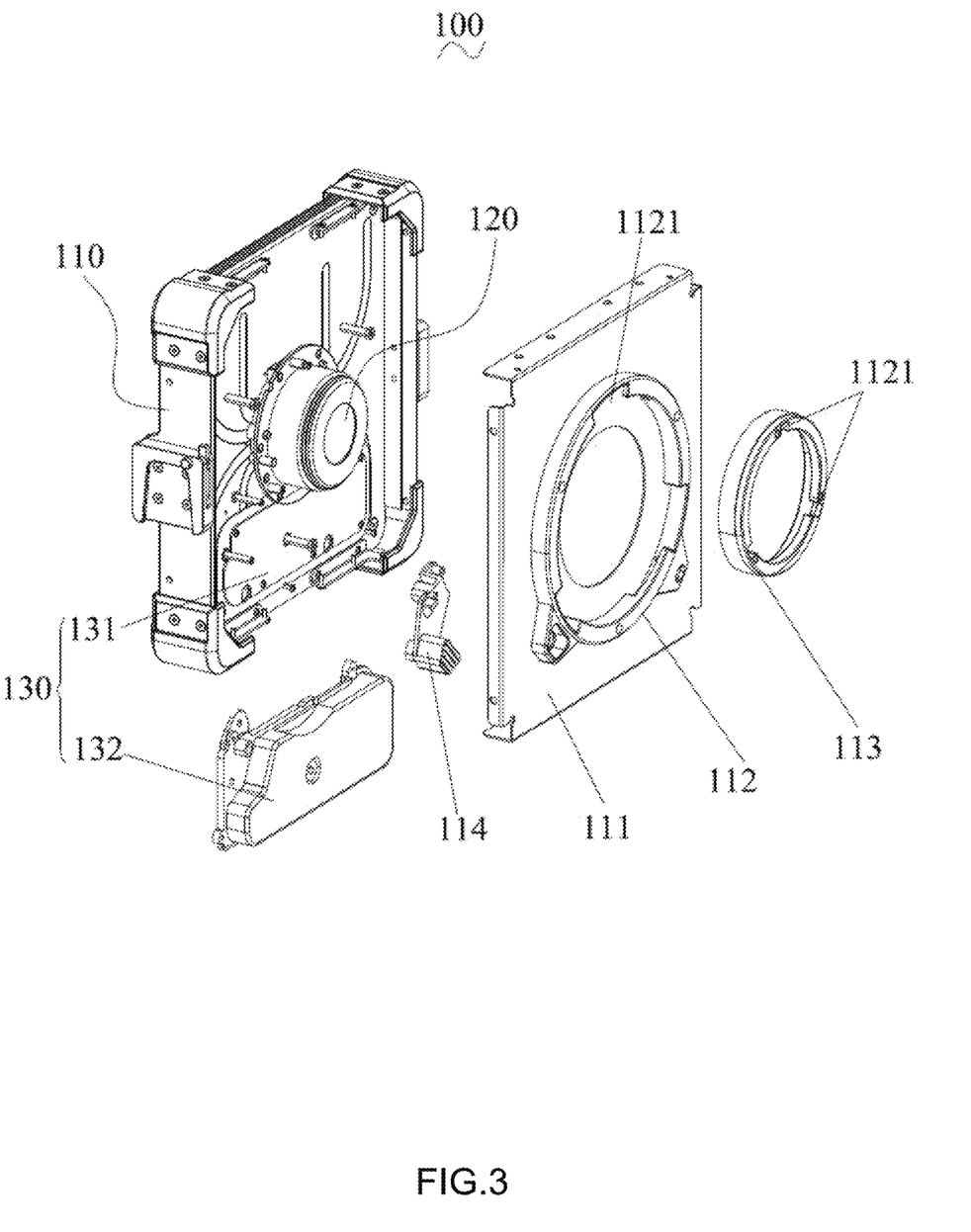
FIG. 3 is an exploded schematic diagram of a lamp main body shown in FIG. 2.

As shown in FIG. 3, the lamp main body 100 includes a base 110, a lighting component 120, and a control component 130. The lighting component 120 is provided on the base 110, and the control component 130 is electrically connected to the lighting component 120. The base 110 is provided with a panel 111, an outer ring buckle seat 112, and an inner ring buckle seat 113 at the light emitting surface 101. The outer ring buckle seat 112 and the inner ring buckle seat 113 are provided on the panel 111. In an implementation mode, geometric centers of the outer ring buckle seat 112 and the inner ring buckle seat 113 are on the same straight line.

Figure 4:
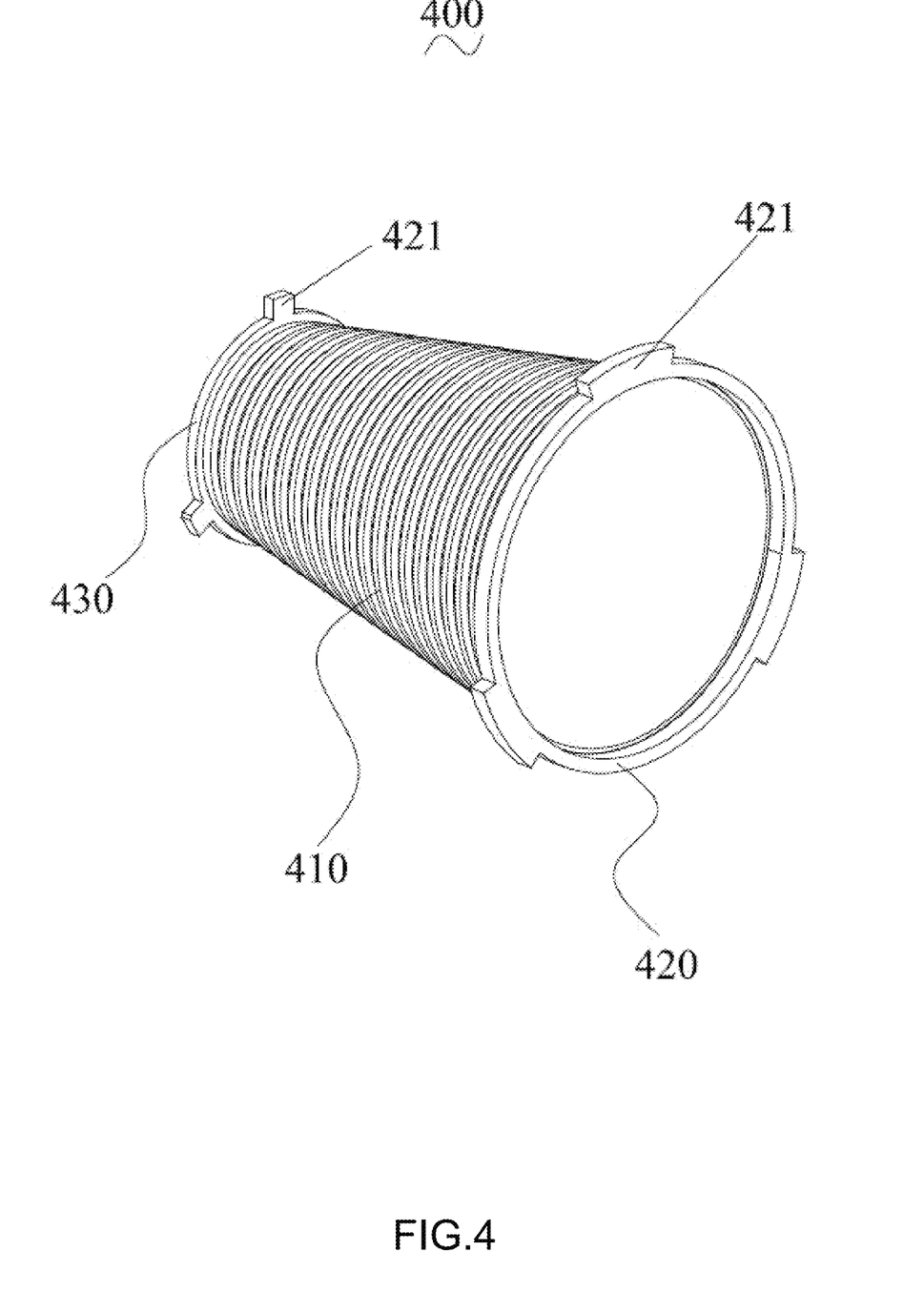
FIG. 4 is a schematic structural diagram of a lampshade shown in FIG. 2.

As shown in FIG. 4, the lampshade 400 includes a main cover body 410, an outer connection ring 420, and an inner connection ring 430. The main cover body 410 has a hollow conical structure; the outer connection ring 420 and the inner connection ring 430 are respectively provided at two ends of the main cover body. The outer connection ring 420 is movably connected and matched with the outer ring buckle seat 112, the inner connection ring 430 is movably connected and matched with the inner ring buckle seat 113. When in use, the lampshade 400 can be selected to match with the outer ring buckle seat 112 or the inner ring buckle seat 113 as needed, thereby changing lighting modes of the lamp. The specific working principle will be explained in the following.

The main cover body 410 of the lampshade 400 adopts a telescopic folding structure, a distance between the outer connection ring 420 and the inner connection ring 430 can be changed by a telescopic folding of the main cover body 410. In this way, the telescopic folding can change the overall length of the lampshade 400, while also matching an assembly relationship between the lampshade 400 and the lamp main body 100, thus achieving different light shielding effects. In an implementation mode, an inner side of the main cover body 410 is provided with a reflective coating or a reflective film, which reflects light shining on the inner side to ensure that the intensity of the light emitted from the lampshade 400 is not excessively weakened.

Figure 5:
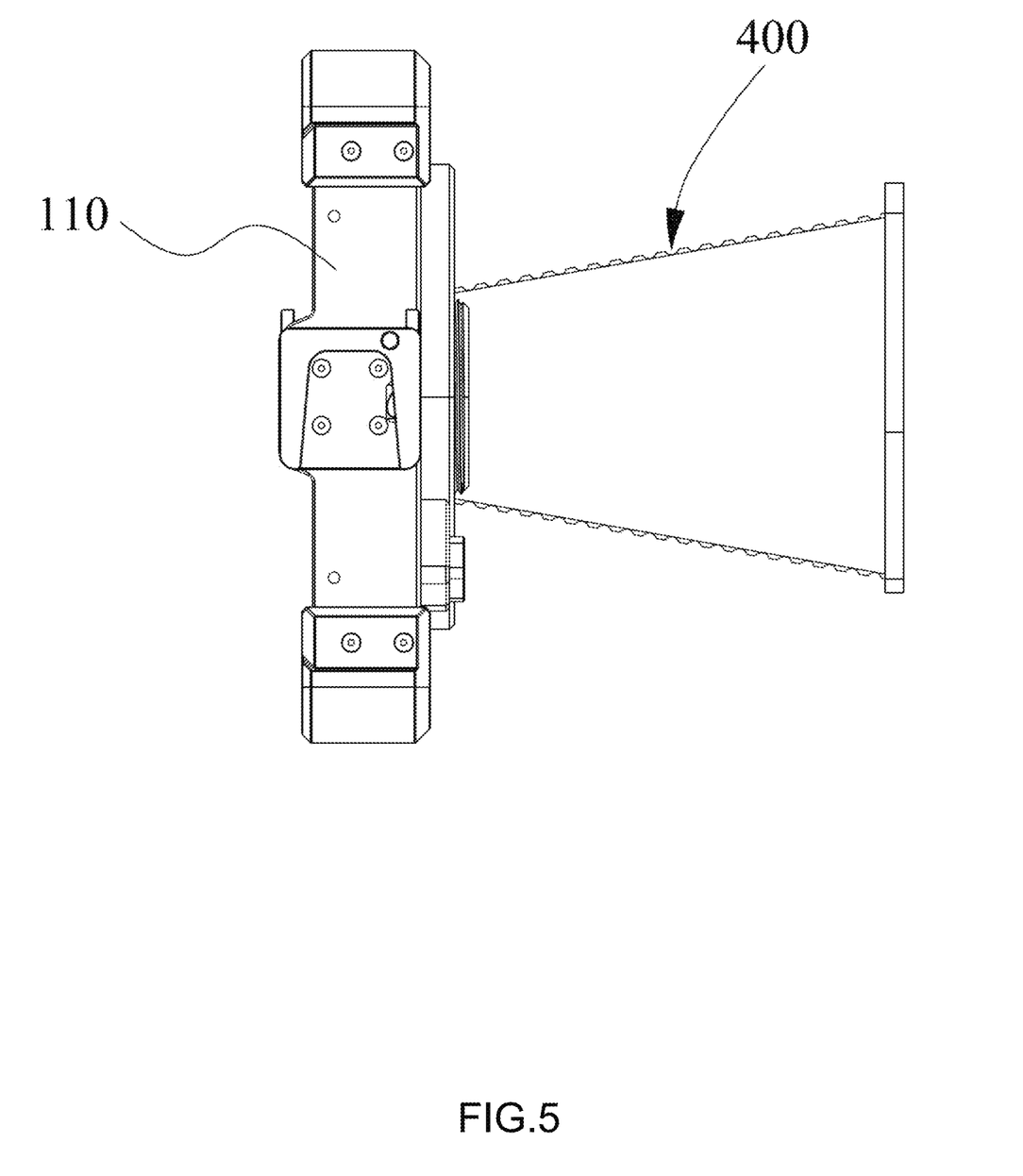
FIG. 5 is a first sate schematic diagram where the lampshade is matched with the lamp main body.
Figure 6:
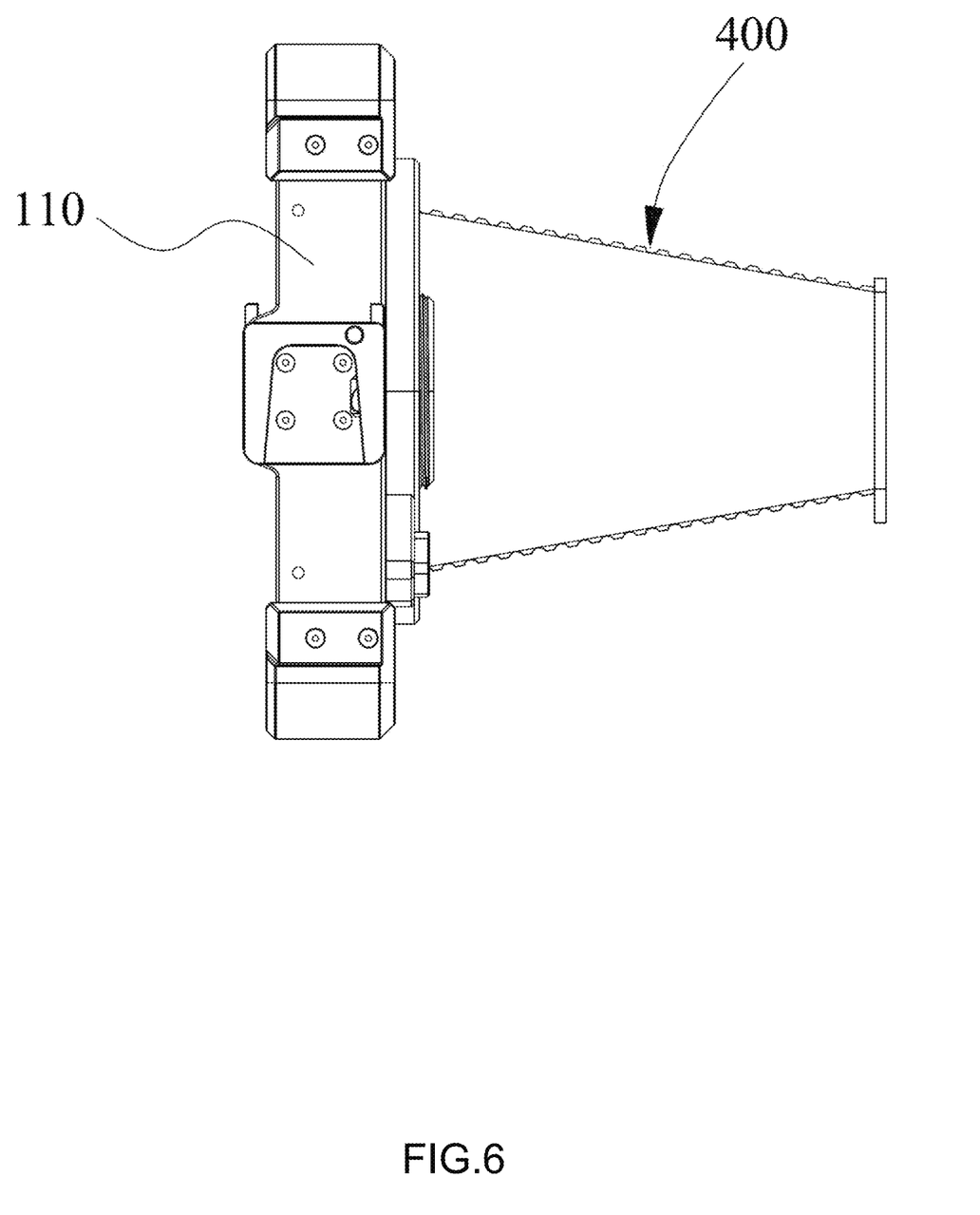
FIG. 6 is a second sate schematic diagram where the lampshade is matched with the lamp main body.

In this embodiment, the outer ring buckle seat 112 and the inner ring buckle seat 113 are both provided with a buckle notch 1121 (as shown in FIG. 3); the outer connection ring 420 and the inner connection ring 430 are both provided with a buckle block 421 (as shown in FIG. 4). The buckle notch 1121 and the buckle block 421 are cooperated with each other. When the lampshade 400 is matched with the outer ring buckle seat 112 (as shown in FIG. 6), the buckle block 421 of the outer connection ring 420 is inserted into the buckle notch 1121 of the outer ring buckle seat 112, and then clamped together with the outer ring buckle seat 112. When the lampshade 400 is matched with the inner ring buckle seat 113 (as shown in FIG. 5), the buckle block 421 of the inner connection ring 430 is inserted into the buckle notch 1121 of the inner ring buckle seat 113, and then clamped together with the inner ring buckle seat 113.

Figure 7:
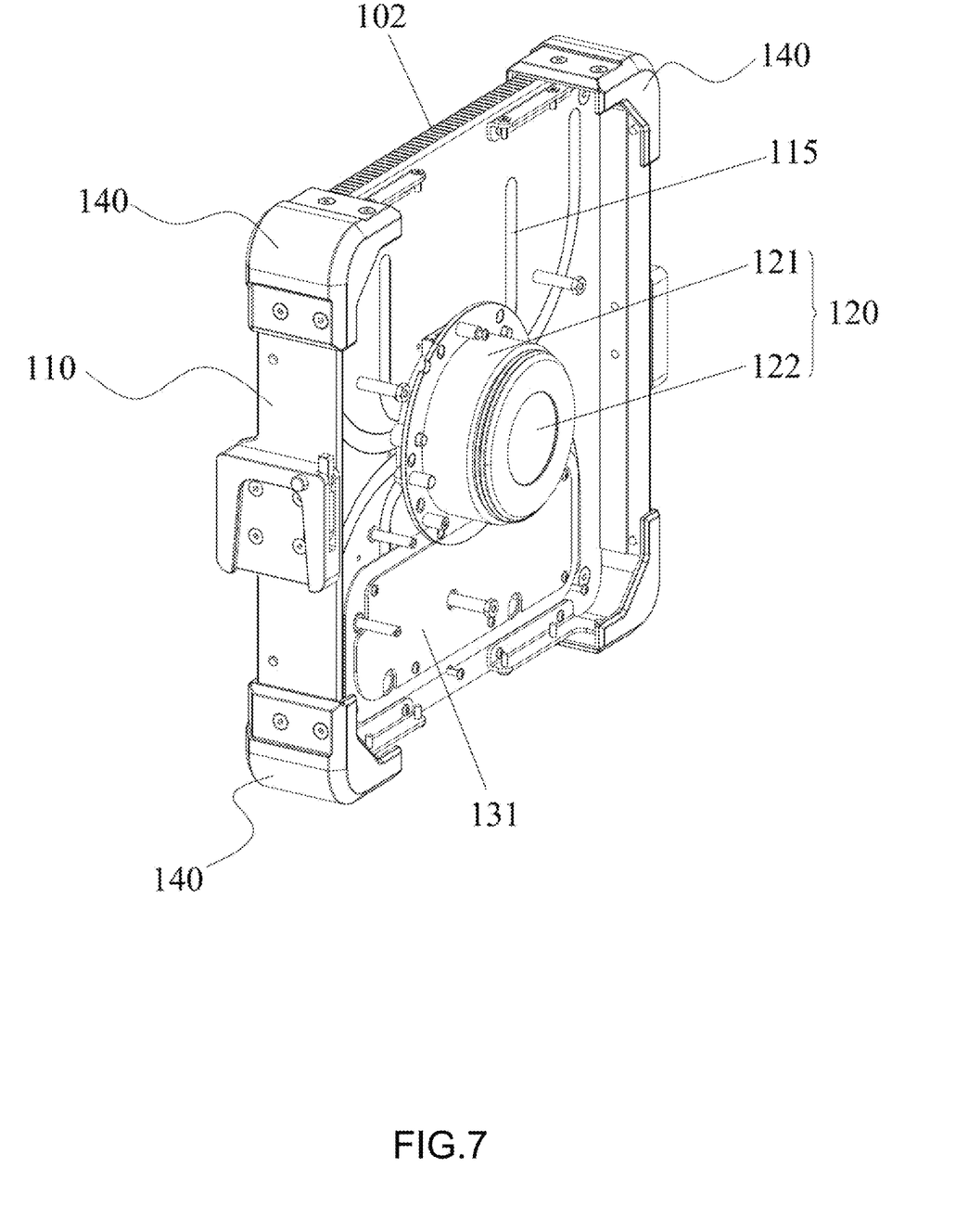
FIG. 7 is a schematic structural diagram of a base and a lighting component shown in FIG. 3.

In this embodiment, as shown in FIG. 7, the lighting component 120 includes a lighting slab (not shown), a reflect light barrel 121, and a lens 122. The reflect light barrel 121 is mounted on the base 110 by a bolt, the lighting slab is accommodated inside the reflect light barrel 121, and the lens 122 is covered on an end face of the reflect light barrel 121.

As shown in FIG. 3, the control component 130 includes a PCB board 131 and a protective box 132. The PCB board 131 is installed on the base 110, and the protective box 132 is covered on a periphery of the PCB board 131. A sealant or a waterproof sealing ring is provided between the protective box 132 and the base 110 to prevent moisture from affecting the PCB board 131.

Next, based on the above structure, the principle of changing the lighting modes of the lampshade 400 of the multifunctional photography light 10 of the present disclosure will be explained.

During use, the lighting slab is powered on to emit light, and the light passes through the lens 122 and shines out from the light emitting surface 101 of the lamp main body 100. By using the lampshade 400, the light emitted can present different modes, mainly including: obscured flood mode, obscured spotlight mode, and unobstructed mode. When the obscured flood mode is selected, the inner connection ring 430 of the lampshade 400 is connected to the inner ring buckle seat 113 of the lamp main body 100 (as shown in FIG. 5), that is, the inner connection ring 430 of the lampshade 400 is closer to the panel 111 than the outer connection ring 420, and the lampshade 400 as a whole presents a horn structure. In this way, the light emitted by the lighting component 120 shines into the lampshade 400, and after multiple refractions and reflections, the light shines out from the outer connection ring 420. Due to a significantly larger diameter of the outer connection ring 420 compared to the lens 122, the illumination range of the light is larger, and the lampshade 400 has a certain degree of flood effect while providing shielding.

When the obscured spotlight mode is selected, the outer connection ring 420 of the lampshade 400 is connected to the outer ring buckle seat 112 of the lamp main body 100 (as shown in FIG. 6). At this time, the lampshade 400 as a whole presents an inverted horn structure, and the light emitted by the lighting component 120 is refracted and reflected multiple times before shining out from the inner connection ring 430. Along a direction of illumination, an aperture through which the light can pass continuously is decreased. In this way, the illumination range of the emitted light is relatively small, and the lampshade 400 has a certain degree of focusing effect while providing shielding.

It is worth noting that during a selection of the obscured flood mode and obscured spotlight mode, a user can also compress or stretch the main cover body 410 to change the overall length of the lampshade 400, thereby further adjusting the illumination range of the emitted light.

When using the unobstructed mode, the user can fully fold the lampshade 400 so that a protruding part of the lampshade 400 relative to the panel 111 does not exceed a height of the reflect light barrel 121. In this way, the light emitted by the lighting component 120 will not be obstructed by the main cover body 410, and the illumination range of the emitted light will be larger.

Compared with the existing technology, the lampshade 400 of the present disclosure can adjust the lighting mode by changing the coordination relationship with the lamp main body 100 and its own state, using one lampshade 400. Specifically, the lampshade 400 has the outer connection ring 420 and the inner connection ring 430 at the two ends. The user can selectively match it with the outer ring buckle seat 112 or the inner ring buckle seat 113 according to needs, so that the lampshade 400 presents a "horn structure" or an "inverted horn structure". When presenting the "horn structure", the aperture through which light can pass along the direction of light emission is continuously increased, thereby providing both shielding and flood effects. When presenting the "inverted horn structure", the aperture through which light can pass along the direction of light emission is continuously decreased, thereby providing both shielding and focusing effects. Moreover, the main cover body 410 of the lampshade 400 adopts a telescopic folding structure. During the obscured flood mode and obscured spotlight mode, by changing the overall length of the main cover body 410, the refraction and reflection states of the emitted light can be adjusted again, thereby changing the mode and lighting range.

Figure 8:
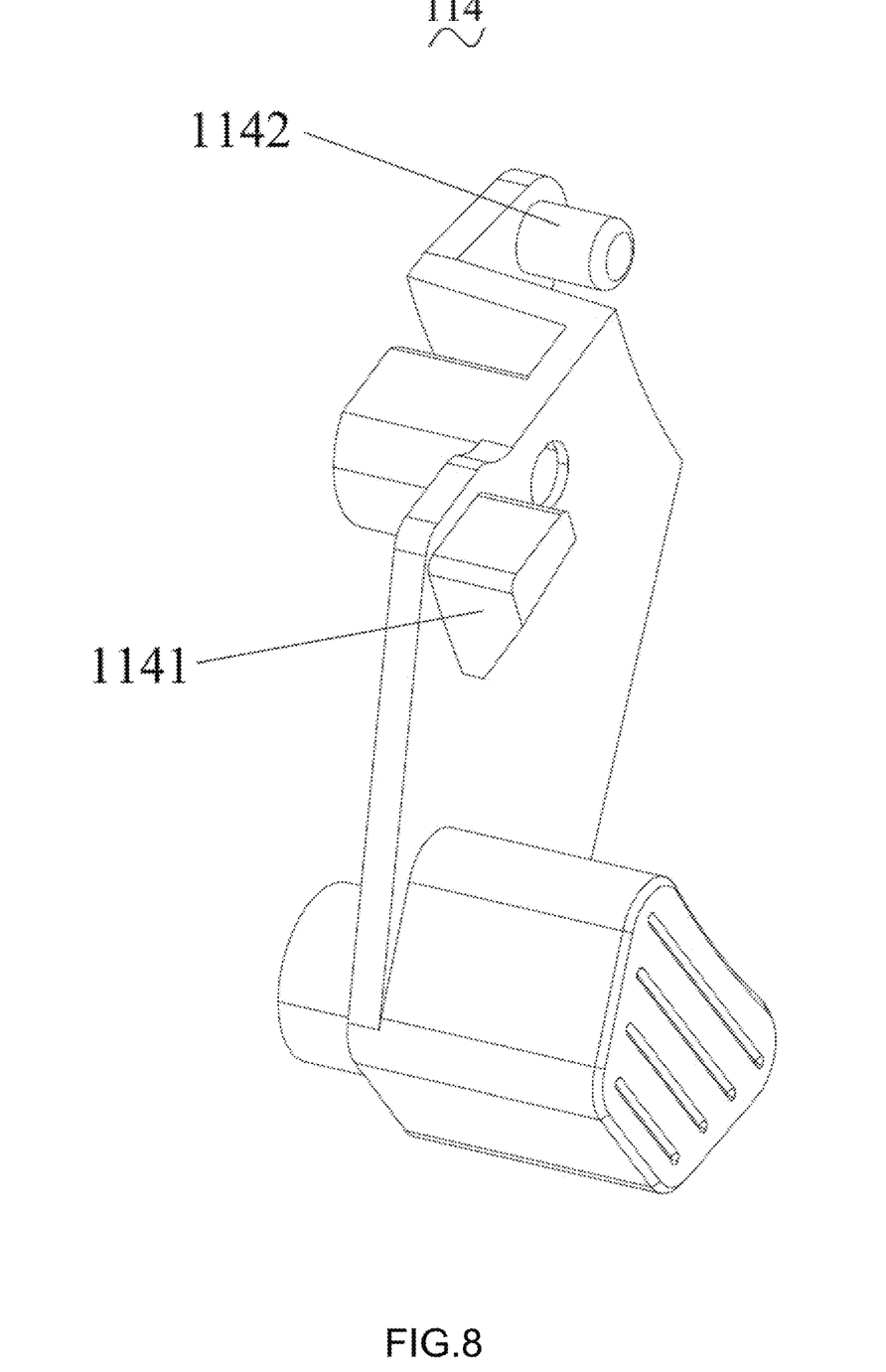
FIG. 8 is a schematic structural diagram of a linkage locking piece shown in FIG. 3.

In this embodiment, the panel 111 is provided with a linkage locking piece 114 (as shown in FIG. 3), which is movably provided on the base 110 through a spring. As shown in FIG. 8, the linkage locking piece 114 is provided with an outer ring protrusion 1141 and an inner ring protrusion 1142. The outer ring protrusion 1141 is located at a position of the outer ring buckle seat 112 and is configured to cooperate with the buckle block 421 of the outer connection ring 420. The inner ring protrusion 1142 is located at a position of the inner ring buckle seat 113 and is configured to cooperate with the buckle block 421 of the inner connection ring 430.

When in use, when the linkage locking piece 114 is pressed, the outer ring protrusion 1141 and the inner ring protrusion 1142 will be both retracted into the panel 111, and the outer connection ring 420 and the inner connection ring 430 of the lampshade 400 can be clamped and matched with the outer ring buckle seat 112 and the inner ring buckle seat 113. After unloading the force, the linkage locking piece 114 is reset again under an action of the spring, the outer ring protrusion 1141 and the inner ring protrusion 1142 are exposed again, thereby blocking the buckle notch 1121. In this way, the outer connection ring 420 that completes the cooperation cannot be detached from the outer ring buckle seat 112, and the inner connection ring 430 cannot be detached from the inner ring buckle seat 113, thus achieving a locking of the lampshade 400, allowing the lampshade 400 to be stably provided on the lamp main body 100.

It should be noted that in the present disclosure, the control of the outer ring buckle seat 112 and the inner ring buckle seat 113 can be achieved through the linkage locking piece 114, which not only solves installation and disassembly problem of the lampshade 400, but also does not require too many operation buttons, rendering it convenient for the user to operate.

Compared to existing technologies, the multifunctional photography light 10 of the present disclosure also achieves a flattened structure, which renders the overall volume occupied by the lamp smaller, rendering it convenient for the user to carry and transport. Furthermore, while downsizing, it also brings about difficulties in heat dissipation.

In order to improve a heat dissipation performance of the multifunctional photography light 10, in this embodiment, as shown in FIG. 7, the base 110 is provided with a plurality of fins (not shown) at the heat dissipation surface 102, and the heat dissipation fan 300 is provided on the fins. In an implementation mode, the base 110 is provided with a heat pipe 115, and the heat pipe 115 is attached to a back of the lighting slab and extended to the fins. When in use, the lighting slab is powered on to emit light and heat, and the heat pipe 115 will evenly and quickly transfer the heat generated by the lighting slab to the fins; subsequently, the heat dissipation fan 300 is started to accelerate airflow around the fins, thereby improving a heat exchange efficiency of the fins.

In other embodiments, the lamp main body 100 further includes a corner guard 140 (as shown in FIG. 7), the corner guard 140 is provided at a corner of the base 110. The corner guard 140 is used to protect the lamp main body 100 to prevent it from being bumped or dropped and damaged. The corner guard 140 can be made of a rubber material, which can provide good cushioning effect in case of collision or drop.

In summary, the multifunctional photography light 10 of the present disclosure, which realizes flattening, can not only meet needs of miniaturization, but also improve the lampshade 400 on the basis of realizing multifunctional lighting modes to enhance a convenience of carrying and transporting, and reduce the burden on the user.

The above embodiments only express some embodiments of the present disclosure, and their descriptions are more specific and detailed, but should not be understood as limiting the scope of the present disclosure patent. It should be pointed out that for those skilled in the art, serval modifications and improvements can be made without departing from the inventive concept, which are within the protection scope of the present disclosure. Therefore, the protection scope of the present disclosure should be based on the appended claims.

What is claimed is:

1. A multifunctional photography light, comprising: a lamp main body, a bracket, a heat dissipation fan, and a lampshade;
    wherein the bracket is detachably provided on one side of the lamp main body, the lamp main body has a light emitting surface and a heat dissipation surface; the heat dissipation fan is provided on the heat dissipation surface, and the lampshade is provided on the light emitting surface;
    the lamp main body comprises a base, a lighting component, and a control component; the lighting component is provided on the base, and the control component is electrically connected to the lighting component;
    the base is provided with a panel, an outer ring buckle seat, and an inner ring buckle seat at the light emitting surface; the outer ring buckle seat and the inner ring buckle seat are provided on the panel;
    the lampshade comprises a main cover body, an outer connection ring, and an inner connection ring; the main cover body has a hollow conical structure; the outer connection ring and the inner connection ring are respectively provided at two ends of the main cover body; the outer connection ring is movably connected to the outer ring buckle seat, and the inner connection ring is movably connected to the inner ring buckle seat.

2. The multifunctional photography light according to claim 1, wherein the main cover body of the lampshade is a telescopic folding structure;
    a distance between the outer connection ring and the inner connection ring is changed by a telescopic folding of the main cover body.

3. The multifunctional photography light according to claim 2, wherein a reflective coating or a reflective film is provided on an inner side surface of the main cover body.

4. The multifunctional photography light according to claim 1, wherein the outer ring buckle seat and the inner ring buckle seat are both provided with a buckle notch,
    the outer connection ring and the inner connection ring are both provided with a buckle block,
    the buckle notch is cooperated with the buckle block.

5. The multifunctional photography light according to claim 4, wherein a linkage locking piece is provided on the panel, and the linkage locking piece is movably provided on the base through a spring;
    the linkage locking piece is provided with an outer ring protrusion and an inner ring protrusion;
    the outer ring protrusion is located at a position of the outer ring buckle seat and is configured to cooperate with the buckle block of the outer connection ring;
    the inner ring protrusion is located at a position of the inner ring buckle seat and is configured to cooperate with the buckle block of the inner connection ring.

6. The multifunctional photography light according to claim 1, wherein the lighting component comprises a lighting slab, a reflect light barrel, and a lens,
    the reflect light barrel is mounted on the base by a bolt;
    the lighting slab is accommodated in the reflect light barrel, and the lens is provided on an end face of the reflect light barrel.

7. The multifunctional photography light according to claim 6, wherein the base is provided with a plurality of fins at the heat dissipation surface, and the heat dissipation fan is provided on the fins;
    the base is provided with a heat pipe, and the heat pipe is attached to a back of the lighting slab and extend to the fins.

8. The multifunctional photography light according to claim 1, wherein the control component comprises a PCB board and a protective box,
    the PCB board is provided on the base, the protective box is provided on a periphery of the PCB board, and there is a sealant or a waterproof sealing ring between the protective box and the base.

9. The multifunctional photography light according to claim 1, wherein the lamp main body comprises a corner guard, and the corner guard is provided at a corner of the base and is made of rubber material.

* * * * *